United States Patent
Kang et al.

(10) Patent No.: US 12,401,030 B2
(45) Date of Patent: Aug. 26, 2025

(54) POSITIVE ELECTRODE MATERIAL COMPRISING A SOLID ELECTROLYTE FOR SOLID-STATE RECHARGEABLE LITHIUM ION BATTERY WITH A HIGH THERMAL STABILITY

(71) Applicants: UMICORE, Brussels (BE); UMICORE KOREA LTD., Chungcheongnam-do (KR); POSTECH ACADEMY-INDUSTRY FOUNDATION, Gyeongsangbuk-do (KR)

(72) Inventors: Byoungwoo Kang, Gyeongsangbuk-do (KR); Seung-Jun Woo, Gyeongsangbuk-do (KR)

(73) Assignees: UMICORE, Brussels (BE); UMICORE KOREA LTD., Chungcheongnam-do (KR); POSTECH ACADEMY-INDUSTRY FOUNDATION, Gyeongsangbuk-do (KR)

( * ) Notice: Subject to any disclaimer, the term of this patent is extended or adjusted under 35 U.S.C. 154(b) by 676 days.

(21) Appl. No.: 17/431,731

(22) PCT Filed: Feb. 19, 2020

(86) PCT No.: PCT/IB2020/051355
§ 371 (c)(1),
(2) Date: Aug. 18, 2021

(87) PCT Pub. No.: WO2020/170136
PCT Pub. Date: Aug. 27, 2020

(65) Prior Publication Data
US 2022/0085368 A1    Mar. 17, 2022

Related U.S. Application Data

(60) Provisional application No. 62/807,863, filed on Feb. 20, 2019, provisional application No. 62/807,833, filed on Feb. 20, 2019.

(30) Foreign Application Priority Data

Mar. 13, 2019  (EP) ..................... 19162577
Mar. 13, 2019  (EP) ..................... 19162591
May 24, 2019  (EP) ..................... 19176362

(51) Int. Cl.
*H01M 4/525* (2010.01)
*H01M 4/02* (2006.01)
(Continued)

(52) U.S. Cl.
CPC ......... *H01M 4/525* (2013.01); *H01M 4/0471* (2013.01); *H01M 4/131* (2013.01);
(Continued)

(58) Field of Classification Search
CPC .... H01M 4/525; H01M 4/0471; H01M 4/131; H01M 4/1391; H01M 4/382;
(Continued)

(56) References Cited

U.S. PATENT DOCUMENTS

| | | |
|---|---|---|
| 5,500,291 A | 3/1996 | Minami et al. |
| 2007/0087269 A1 | 4/2007 | Inda |

(Continued)

FOREIGN PATENT DOCUMENTS

| | | |
|---|---|---|
| JP | 2008112661 A | 5/2008 |
| JP | 2012186181 A | 9/2012 |

(Continued)

OTHER PUBLICATIONS

ISA/KR; International Search Report and Written Opinion for International Patent Application No. PCT/IB2020/051355 dated Jun. 11, 2020, 11 pages.
(Continued)

*Primary Examiner* — Eugenia Wang
(74) *Attorney, Agent, or Firm* — NK Patent Law

(57) ABSTRACT

A catholyte destined to be used in a lithium ion solid-state battery, said catholyte comprising: (i) a solid electrolyte
(Continued)

powder having a formula: $Li_{(3.5+L+x)}Si_{(0.5+s-x)}P_{(0.5+p-x)}Ge_{2x}O_{4+a}$, wherein $-0.10 \leq L \leq 0.10$, $-0.10 \leq s \leq 0.10$, $-0.10 \leq p \leq 0.10$, $-0.40 \leq a \leq 0.40$, and $0.00 \leq x \leq 0.30$, and (ii) a positive electrode active material powder having a formula: $Li_{1+k}M'_{1-k}O_2$ where $M'=Ni_{1-x'-y'-z'}Mn_{x'}Co_{y'}A_{z'}$ with $-0.05 \leq k \leq 0.05$, $0 \leq x' \leq 0.40$, $0.05 \leq y' \leq 0.40$, and $0 \leq z' \leq 0.05$, wherein A is a doping element which is different to Li, M' and O, said positive active material powder comprising particles having a layered R-3m crystal structure, said catholyte having a D99≤50 µm and an ionic conductivity of at least $1.0 \times 10^{-6}$ S/m.

10 Claims, 5 Drawing Sheets

(51) Int. Cl.
| | | |
|---|---|---|
| H01M 4/04 | (2006.01) | |
| H01M 4/131 | (2010.01) | |
| H01M 4/1391 | (2010.01) | |
| H01M 4/38 | (2006.01) | |
| H01M 4/505 | (2010.01) | |
| H01M 4/62 | (2006.01) | |
| H01M 10/052 | (2010.01) | |
| H01M 10/0525 | (2010.01) | |
| H01M 10/0562 | (2010.01) | |
| H01M 50/431 | (2021.01) | |

(52) U.S. Cl.
CPC ......... *H01M 4/1391* (2013.01); *H01M 4/382* (2013.01); *H01M 4/505* (2013.01); *H01M 4/62* (2013.01); *H01M 10/052* (2013.01); *H01M 10/0525* (2013.01); *H01M 10/0562* (2013.01); *H01M 50/431* (2021.01); *H01M 2004/028* (2013.01); *H01M 2300/0068* (2013.01); *H01M 2300/0071* (2013.01)

(58) Field of Classification Search
CPC ...... H01M 4/505; H01M 4/62; H01M 10/052; H01M 10/0525; H01M 10/0562; H01M 50/431; H01M 2004/028; H01M 2300/0068; H01M 2300/0071; H01M 2220/20; Y02E 60/10
See application file for complete search history.

(56) References Cited

U.S. PATENT DOCUMENTS

| | | | |
|---|---|---|---|
| 2008/0220334 A1 | 9/2008 | Inda | |
| 2011/0300432 A1* | 12/2011 | Snyder | H01M 4/485 |
| | | | 429/122 |
| 2013/0295451 A1 | 11/2013 | Miki | |
| 2015/0171465 A1* | 6/2015 | Chao | C04B 35/6261 |
| | | | 429/322 |
| 2015/0180085 A1 | 6/2015 | Homma | |
| 2015/0357644 A1 | 12/2015 | Holme et al. | |
| 2016/0172675 A1 | 6/2016 | Ito et al. | |
| 2016/0293946 A1* | 10/2016 | Ritter | H01M 4/485 |
| 2016/0365571 A1* | 12/2016 | Kim | H01M 4/505 |
| 2017/0149065 A1 | 5/2017 | Chao et al. | |
| 2018/0375092 A1* | 12/2018 | Park | H01M 10/052 |
| 2020/0144617 A1* | 5/2020 | Kern | C01G 53/42 |

FOREIGN PATENT DOCUMENTS

| | | |
|---|---|---|
| JP | 2016519412 A | 6/2016 |
| KR | 101547972 B1 | 8/2015 |
| WO | 2014041669 A1 | 3/2014 |
| WO | 2015016046 A1 | 2/2015 |
| WO | 2018089430 A1 | 5/2018 |

OTHER PUBLICATIONS

"Elbow Jet Air Classifier", Elcan Industries, 4 pages, accessed at: https://elcanindustries.com/elbow-jet-air-classifier/.

EPO, International Search Report and Written Opinion for International Application No. 20758623.1 dated Jun. 30, 2023.

Burmakin, E.I., et al., "Litium-Conducitng Solid Electrolytes of Li4Ge)4-Li3PO4 System with Additions of Zirconium Ions", Russian Journal of Electrochemistry, 2010, pp. 243-246, vol. 46, No. 2.

Kamphorst, J.G., et al., "Fast Li Ionic Conduction in Solid Solutions of the System Li4GeO4—Li2ZnGeO4—Li3PO4", Solid State Ionics, 1980, pp. 187-197, vol. 1.

Muy, Sokseiha, et al., Lithium Conductivity and Meyer-Neldel Rule in Li3PO4—Li3VO4-LirGeO4 Lithium Superionic Conductors, Chemistry of Materials, 2018, pp. 5573-5582, vol. 30.

USPTO: Non-final Office Action for U.S. Appl. No. 17/431,728, dated Aug. 23, 2024, 34 pages.

Hodge et al. "Ionic conductivity of Li4SiO4, Li4GeO4, and their solid solutions." Journal of the American Ceramic Society 59, No. 7-8, pp. 360-366. (Year: 1976).

Ivanov-Shitz et al. "Growth and ionic conductivity of Li 3+ x P 1-x G ex O 4 (x=0.34) single crystals." Crystallography Reports 48, pp. 112-115. (Year: 2003).

Deng et al. "Structural and mechanistic insights into fast lithium-ion conduction in Li4SiO4—Li3PO4 solid electrolytes." Journal of the American Chemical Society 137, No. 28, pp. 9136-9145 (Year: 2015).

Koseva et al. "Thermal behavior of germanates with olivine structure." Thermochimica Acta 646, pp. 1-7. (Year: 2016).

USPTO: Final Office Action for U.S. Appl. No. 17/431,728, mailed Feb. 10, 2025, 19 pages.

* cited by examiner

POSITIVE ELECTRODE MATERIAL COMPRISING A SOLID ELECTROLYTE FOR SOLID-STATE RECHARGEABLE LITHIUM ION BATTERY WITH A HIGH THERMAL STABILITY

CROSS-REFERENCE TO RELATED APPLICATIONS

This application is a U.S. National Stage application of International Patent Application No. PCT/IB2020/051355, filed on Feb. 19, 2020, which claims the benefit of European Patent Application No. 19176362.2, filed on May 24, 2019, and the benefit of European Patent Application No. 19162591.2, filed on Mar. 13, 2019, and the benefit of European Patent Application No. 19162577.1, filed on Mar. 13, 2019, and the benefit of U.S. Provisional Patent Application No. 62/807,863, filed on Feb. 20, 2019, and the benefit of U.S. Provisional Patent Application No. 62/807,833, filed on Feb. 20, 2019.

TECHNICAL FIELD AND BACKGROUND

This invention relates to a catholyte comprising a lithium super ionic conductor (LISICON) type solid electrolyte powder (SE) and a positive active material, said catholyte having a high thermal stability. The catholyte according to the invention is suitable for solid-state rechargeable lithium-ion batteries (or SSB for solid-state battery) destined to be used in electric vehicles (EVs).

LSPO (lithium silicon phosphorus oxide) electrolyte, represented by a general formula: $Li_{4\pm x}Si_{1-x}P_xO_4$, has high chemical and electrochemical stabilities, a high mechanical strength, and a high electrochemical oxidation voltage, making this solid electrolyte eligible for EV applications.

However, the compatibility of such a SE with the positive electrode active material to form a catholyte of the SSB is an essential aspect requiring an appropriate selection of both the SE and the positive electrode active material.

In the framework of the present invention, a catholyte means a compound resulting from heating a mixture of a SE and a positive electrode active material powder at a temperature of at least 600° C. under an oxidizing atmosphere, like air.

The use of a catholyte in a SSB has a purpose to improve the capacity of SSB comprising said cathode active material by allowing a better interfacial contact between the positive electrode active material and the SE.

An oxide SE destined to be converted into a catholyte should therefore be stable with a positive electrode material at a temperature superior or equal to 600° C. Chemical and electrochemical instability of SE with the positive electrode material can cause interfacial reactions between SE and positive electrode active material. For example, the reaction between $LiCoO_2$ positive electrode active material with $Li_{10}GeP_2S_{12}$ electrolyte generating $GeS_2$ or cobalt sulfide compound on the interface which responsible in increasing total ionic resistance.

There is a need for designing a positive electrode material which can be converted into a stable catholyte so as to render the use of solid-state batteries made from such a catholyte more performant and therefore more attractive in the field of EV applications.

In addition, a suitable positive electrode active material for EV application is a Lithium Nickel Manganese Cobalt Oxide (hereafter referred to as "NMC") based positive electrode materials which has a sufficient volumetric energy density.

NMC positive active material is moreover used to gain higher capacity with lower content of the less desirable Co after the significant price volatility of the raw Co material.

It is therefore an object of the present invention to provide a SE having an improved thermal stability with a NMC-based positive electrode active material at a temperature superior or equal to 600° C.

Moreover, the catholyte obtained from the heat treatment of a mixture of a SE and a NMC-based positive electrode active material should demonstrate a sufficient first discharge capacity, i.e. a first discharge capacity of at least 160.0 mAh/g.

Metallic Li can be used in the scope of the present invention as an anode of a SSB comprising the catholyte according to the invention.

Provided that the SE according to the present invention can be destined to be used as a solid-state electrolyte between the catholyte and a Li metal-based anode, it must therefore be compatible to said Li metal-based anode of the SSB, meaning that the SE while contacting said anode must remain thermally stable at a temperature superior or equal to 600° C.

SUMMARY OF THE INVENTION

These objectives are achieved by providing a catholyte according to claim 1 which comprises:
(i) a solid electrolyte powder having a formula: $Li_{(3.5+L+x)}Si_{(0.5+s-x)}P_{(0.5+p-x)}Ge_{2x}O_{4+a}$, wherein $-0.10 \leq L \leq 0.10$, $-0.10 \leq s \leq 0.10$, $-0.10 \leq p \leq 0.10$, $-0.40 \leq a \leq 0.40$, and $0.00 \leq x \leq 0.30$, and
(ii) a positive electrode active material powder having a formula: $Li_{1+k}M'_{1-k}O_2$ where $M'=Ni_{1-x'-y'-z'}Mn_{x'}Co_{y'}A_{z'}$ with $-0.055 \leq k \leq 0.05$, $0 \leq x' \leq 0.40$, $0.05 \leq y' \leq 0.40$, and $0 \leq z' \leq 0.05$, said positive electrode active material powder comprising particles having a layered R-3m crystal structure, said catholyte having a D99≤50 μm and an ionic conductivity of at least $1.0 \times 10^{-6}$ S/m.

The dopant A may for example be either one or more of Al, Ca, W, B, Si, Ti, Mg and Zr.

It is indeed demonstrated that the use of the catholyte according to claim 1 in a solid-state battery comprising a LSPO-based SE allows to achieve a first discharge capacity of >170 mAh/g (cfr. EX4-1 in Table 3).

In addition, it has been demonstrated that the SE of constituting the catholyte according to the invention is thermally stable while contacting the Li metal-based anode at a temperature superior or equal to 600° C., confirming its suitability for being used in a SSB comprising this type of anode (cfr. (b) in FIG. 8).

The present invention concerns the following embodiments:

1.—A catholyte destined to be used in a lithium ion solid-state battery, said catholyte comprising:
(i) a solid electrolyte powder having a formula: $Li_{(3.5+L+x)}Si_{(0.5+s-x)}P_{(0.5+p-x)}Ge_{2x}O_{4+a}$, wherein $-0.10 \leq L \leq 0.10$, $-0.10 \leq s \leq 0.10$, $-0.10 \leq p \leq 0.10$, $-0.40 \leq a \leq 0.40$, and $0.00 \leq x \leq 0.30$, and
(ii) a positive electrode active material powder having a formula: $Li_{1+k}M'_{1-k}O_2$ where $M'=Ni_{1-x'-y'-z'}Mn_{x'}Co_{y'}A_{z'}$ with $-0.05 \leq k \leq 0.05$, $0 \leq x' \leq 0.40$, $0.05 \leq y' \leq 0.40$, and $0 \leq z' \leq 0.05$, said positive active material powder comprising particles having a layered R-3m crystal structure, said catholyte having a D99≤50 µm and an ionic conductivity of at least 1.0×10⁻⁶ S/m.

In this first embodiment, A is a doping element which is different from the Li, M' and O elements.

The dopant A may for example be either one or more of Al, Ca, W, B, Si, Ti, Mg and Zr.

2.—The catholyte according to the embodiment 1 wherein said mixture comprising a solid electrolyte:positive electrode active material weight ratio superior or equal to 10:90 and inferior or equal to 50:50.

3.—The catholyte according to the embodiment 1 or 2, wherein the positive electrode active material powder comprises particles having a monolithic or polycrystalline morphology.

4.—The catholyte according to any of the preceding embodiments wherein: 30 µm≤D99≤50 µm.

5.—The catholyte according to any of the preceding embodiments an ionic conductivity of at least 1.0×10⁻⁵ S/m.

6.—A process for making a catholyte according to any of the preceding embodiments, comprising the steps of:

mixing a solid electrolyte powder having a formula: $Li_{(3.5+L+x)}Si_{(0.5+s-x)}P_{(0.5+p-x)}Ge_{2x}O_{4+a}$, with a positive electrode active material powder having a formula: $Li_{1+k}M'_{1-k}O_2$ where $M'=Ni_{1-x'-y'-z'}Mn_{x'}Co_{y'}A_{z'}$ with $-0.05 \leq k \leq 0.05$, $0 \leq x' \leq 0.40$, $0.05 \leq y' \leq 0.40$, and $0 \leq z' \leq 0.05$, so as to obtain a mixture, heating the mixture in an oxidizing atmosphere at a temperature of at least 600° C. and at most 800° C., thereby obtaining the catholyte according to any of the preceding embodiments.

Optionally, the solid electrolyte powder has a D50 of at least 0.1 µm and at most 10 µm.

The positive active material powder may have a D50 of at least 1 µm and at most 25 µm.

7.—The process according to the embodiment 6, wherein the solid electrolyte powder and the positive electrode active material powder are mixed together in a solid electrolyte:positive electrode active material weight ratio superior or equal to 10:90 and inferior or equal to 50:50.

8.—The process according to the embodiment 6 or 7, wherein the step of heating the mixture is performed during at least 1 hour and at most 20 hours.

9.—The process according to any of the embodiments 6 to 8, wherein the step of heating the mixture is performed in an atmosphere comprising at least 15 vol % of oxygen, in particular in air.

10.—A composite comprising the catholyte according to any of the embodiments 1 to 6, and a solid electrolyte powder.

11.—A solid state battery comprising the composite according to the embodiment 10 and a Li metal anode.

DETAILED DESCRIPTION

Figure 1:
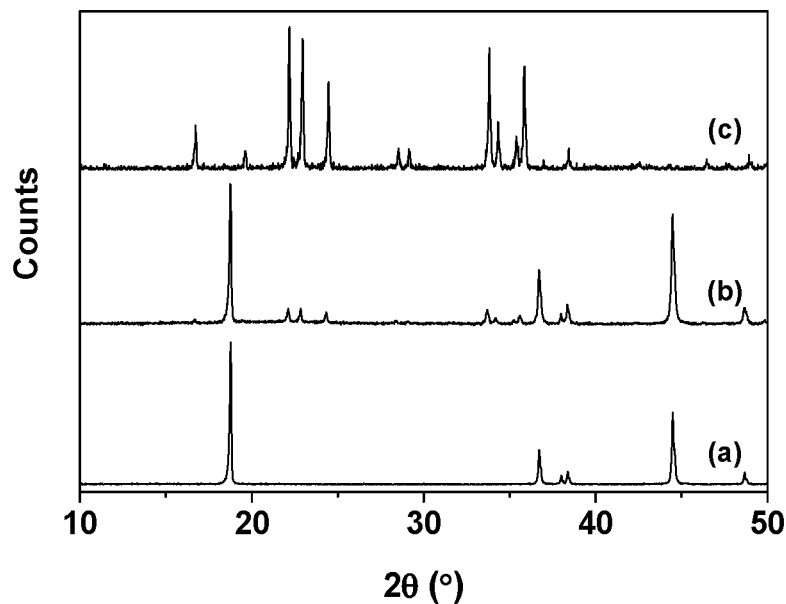
FIG. 1. Comparison of X-ray diffraction pattern of (a) polycrystalline NMC811 ($M'=Ni_{0.80}Mn_{0.10}Co_{0.10}$), (b) polycrystalline NMC811 after co-sintered with $Li_{3.5}Si_{0.5}P_{0.5}O_4$ electrolyte (EX1), and (c) pristine $Li_{3.5}Si_{0.5}P_{0.5}O_4$.

In the following description, preferred embodiments are described in detail to enable practice of the invention. Although the invention is described with reference to these specific preferred embodiments, it will be understood that the invention is not limited to these embodiments. To the contrary, the invention includes numerous alternatives, modifications and equivalents as will become apparent from consideration of the following detailed description.

In particular, the present invention relates with the use of LSP(G)O as an electrolyte of a SSBs comprising a Li metal-based anode and a catholyte made from a mixture of a NMC type of positive electrode active material and the LSP(G)O electrolyte.

Both polycrystalline and monolithic NMC can be used as a positive electrode active material in the present invention. A "monolithic" morphology refers here to a morphology where a secondary particle contains basically only one primary particle. In the literature they are also called single crystal material, mono-crystal material, and one-body material. The preferred shape of the primary particle could be described as pebble stone shaped. The monolithic morphology can be achieved by using a high sintering temperature, a longer sintering time, and the use of a higher excess of lithium. A "polycrystalline" morphology refers to a morphology where a secondary particle contains more than one primary particles.

It is demonstrated in the Examples provided hereunder that the powderous positive electrode active material according to the present invention and the catholyte made from said positive electrode active material remain stable at a temperature higher than 600° C. Furthermore, the catholyte according to the present invention also demonstrates stability in presence of a Li metal anode. Therefore, the combination of the catholyte according to the present invention with a Li metal-based anode can lead to SSBs with excellent thermal stability suitable for EV applications.

The (solid) catholyte material is prepared by mixing the LSPGO SE composition with the NMC composition so as to produce the catholyte which is subjected to a heat treatment at 600° C.~800° C. for 1~20 hours under oxidizing atmosphere. In particular, the method for producing said catholyte consists in a co-sintering process wherein the LSPGO SE and the NMC compositions are blended so as to provide a mixture which is then sintered.

There are several ways to obtain each of the compositions of the LSP(G)O material and NMC positive electrode active material in the catholyte. Whereas the difference of the median particle sizes (D50) between the solid electrolyte and positive electrode active material in the catholyte is superior or equal to 2 μm, they can be separated using a classifier such the elbow jet air classifier (https://elcanindustries.com/elbow-jet-air-classifier/). The compositions of separate particles are measured according to E) Inductively Coupled Plasma method so as to determine each of the compositions of the LSP(G)O material and NMC positive electrode active material in the catholyte.

The use of an Electron Energy Loss Spectroscopy (EELS) in a Transmission Electron Microscope (TEM) is another example for obtaining each of the compositions of the LSP(G)O material and NMC positive electrode active material in the catholyte. The elements and their atomic amount can be obtained directly by measuring the EELS of cross-sectional LSP(G)O particles and NMC positive electrode active material particles separately.

In the present invention, the compatibility of LSPO and LSPGO material with the NMC positive electrode active material is examined through the comparison of X-Ray diffraction (XRD) patterns before and after (i.e. in the catholyte) co-sintering process. Structural changes detected from XRD examination, for instance changes observed on the lattice parameter, is an indicator of an incompatibility between the materials. Table 1 shows a list of examples and comparative examples used in this invention, which are the mixtures of positive electrode active materials and solid electrolyte powders with several combinations of mixing ratios and co-sintering temperatures. Several compositions of NMC are examined where the number following NMC indicating the molar fraction of Ni, Mn, and Co, respectively, in the mixture.

The chemical stability of the solid electrolyte of the powderous positive electrode active material according to the present invention with Li metal was examined through a direct contact with the molten Li metal. LSPGO pellet XRD diffraction pattern after exposure with molten Li metal is compared with the original pattern before exposure.

The following analysis methods are used in the Examples:

A) X-ray Diffraction Test

A cylindrical pellet is prepared by the following procedure: 0.175 g of a powderous solid electrolyte compound is put on a mold having a diameter of 1.275 cm. A pressure of 230 MPa is applied to the mold. The pellet is sintered at 700° C. for 3 hours in oxygen atmosphere.

The X-ray diffraction pattern of a pellet sample is collected with a Rigaku X-Ray Diffractometer (D/MAX-2500/PC) using a Cu Kα radiation source emitting at a wavelength of 1.5418 Å. The instrument configuration is set at: 1° Soller slit (SS), 1° divergence slit (DS) and 0.15 mm reception slit (RS). Diffraction patterns are obtained in the range of 10-70° (2θ) with a scan speed of 4° per a minute. Obtained XRD patterns are analyzed by the Rietveld refinement method using X'Pert HighScore Plus software. The software is a powder pattern analysis tool with reliable Rietveld refinement analysis result.

B) Coin Cell Test

For the preparation of a positive electrode, a catholyte containing 0.16 g of NMC, 0.03 g conductor (Super P), and 0.125 g of 8 wt % PVDF binder are mixed in NMP solvent using a planetary centrifugal mixer (Thinky mixer) for 20 minutes. The homogenized slurry is spread on one side of an aluminum foil using a doctor blade coater with a 15 μm gap. The slurry-coated foil is dried and punched as 8 mm diameter circular shape. A Swagelok cell is assembled in an argon-filled glove box with the configuration of positive electrode, separator having a diameter of 13 mm, and lithium foil having a diameter of 11 mm as a negative electrode. 1M $LiPF_6$ in EC/DMC (1:1 wt %) is used as electrolyte. Each cell is cycled at 25° C. using automatic battery cycler Wonatech-WBCS3000. The coin cell testing at 0.1 C in the 4.3~2.5V/Li metal window range for NMC and 5.0~1.5V/Li metal window range for LNMO are used to evaluate the sample rate performance.

C) Particle Size Distribution

The catholyte powder samples used in the particle-size distribution (psd) measurements are prepared by hand grinding the catholyte powder samples using agate mortar and pestle. The psd is measured by using a Malvern Mastersizer 3000 with Hydro MV wet dispersion accessory after having dispersed each of the catholyte powder samples in an aqueous medium. In order to improve the dispersion of the catholyte powder, sufficient ultrasonic irradiation and stirring is applied, and an appropriate surfactant is introduced. D50 and D99 are defined as the particle size at 50% and 99% of the cumulative volume % distributions obtained from the Malvern Mastersizer 3000 with Hydro MV measurements.

D) Electrochemical Impedance Spectroscopy (EIS)

A cylindrical pellet is prepared by following procedure: 0.175 g of a powderous solid electrolyte compound sample is put on a mold having a diameter of 1.275 cm. A pressure of 230 MPa is applied to the mold. The pellet is sintered at 700° C. for 3 hours in oxygen atmosphere. A silver paste is painted on both sides of the pellet to have a sample configuration of Ag/pellet/Ag in order to allow EIS measurements.

EIS measurements are performed using an Ivium-n-Stat instrument: a potentiostat/galvanostat with an integrated frequency response analyzer. This instrument is commonly used in the battery/fuel cell-testing methodologies for collecting an impedance response against a frequency sweep. The measurement frequency range is from $10^6$ Hz to $10^{-1}$ Hz. The setting point/decade is 10 and the setting voltage is 0.05V. Measurement is conducted at room temperature (at 25° C.). The lithium ionic conductivity is calculated based on the equation provided below:

$$\sigma = \frac{L}{R \times A},$$

where L is the thickness of the pellet, A is the area of the sample, and R is the resistance obtained by the electrochemical impedance spectroscopy.

The standard deviation of this EIS measurement is 2.0× $10^{-8}$.

E) Inductively Coupled Plasma (ICP)

The composition of a positive electrode active material, a solid electrolyte, and a catholyte is measured by the inductively coupled plasma (ICP) method using an Agillent ICP 720-ES. 1 gram of a powder sample is dissolved into 50 mL high purity hydrochloric acid (at least 37 wt % of HCl with respect to the total amount of solution) in an Erlenmeyer flask. The flask is covered by a watch glass and heated on a hot plate at 380° C. until complete dissolution of the powder. After being cooled to room temperature, the solution from the Erlenmeyer flask is poured into a 250 mL volumetric flask. Afterwards, the volumetric flask is filled with deionized water up to the 250 mL mark, followed by a complete homogenization. An appropriate amount of solution is taken out by a pipette and transferred into a 250 mL volumetric flask for a second dilution, where the volumetric flask is filled with internal standard and 10% hydrochloric acid up to the 250 mL mark and then homogenized. Finally, this solution is used for ICP measurement.

The following preparation method for LSPO and LSPGO is used in the Examples:

LSPO and LSPGO Preparation

LSPO and LSPGO are synthesized with a conventional solid-state process by blending and high temperature reaction. LSPO is prepared by the following steps:

1) Mixing: $Li_2CO_3$, $SiO_2$, and $(NH_4)_2HPO_4$ with total weight of around 6.0 g according to the corresponding molar ratio were put on a 250 ml bottle with 140 ml of deionized water and each 100 g of Y doped $ZrO_2$ balls having 3, 5, and 10 mm diameter. The bottle was rotated in a conventional ball mill equipment with 300 RPM for 24 hours. The homogeneously mixed slurry was dried at 90° C. for 12 hours.

2) Calcination: the dried mixture was calcined at 900° C. for 6 hours in Ar atmosphere.

3) Pulverization: 1.4 g of calcined powder was put on a 45 ml bottle with 30 ml of acetone and 3.4 g of Y doped $ZrO_2$ balls having a dimeter of 1 mm. The bottle was rotated in a conventional ball mill equipment with 500 RPM for 6 hours. The pulverized powder was dried at 70° C. for 6 hours.

4) Sintering: The dried powder was sintered at 700° C. for 3 hours in oxygen atmosphere to get the final LSPO solid electrolyte compound having a formula of $Li_{3.5}Si_{0.5}P_{0.5}O_4$.

Ge bearing LSPO samples (LSGPO) having a general formula of $Li_{(3.5+x)}Si_{(0.5-x)}P_{(0.5-x)}Ge_{2x}O_{4+a}$ are prepared in the same manner as LSPO except that $GeO_2$ was added in the mixing step and the amount of $Li_2CO_3$, $SiO_2$, and $(NH_4)_2HPO_4$ were adjusted in the mixing step according to the target molar ratio of x=0.10.

LSPO and LSGPO samples have a median particle size (D50) of 2 μm.

The invention is further illustrated in the following examples to examine the chemical stability of the LSPO and LSPGO with positive electrode material:

Example 1

Polycrystalline NMC811 positive electrode active material is prepared according to the following steps:

1) Preparation of metal bearing precursor (MBP)

MBP811 is prepared by co-precipitation process performed in a reactor with a liquid volume of 10 L using an overflow tube and an impeller motor of 400 W. The impeller of 10 cm diameter is stirred at 800 RPM. The reactor has 4 baffles to allow vigorous stirring. A flow of 50 L/h of nitrogen gas is applied above the liquid level to avoid oxidation due to the vigorous stirring. Three solutions containing nickel, manganese, and cobalt sulfate ($NiSO_4$, $MnSO_4$, $CoSO_4$) with a total concentration of 110 g/L metal are prepared to yield a mixed $MeSO_4$ solution, wherein Me consists of Ni, Mn, and Co. A solution of 400 g/L NaOH and an undiluted ammonia solution of 25% are used. Two-steps process including seed preparation and core precipitation is used.

1-1) Seed Preparation:

A $Ni_{0.80}Mn_{0.10}Co_{0.10}(OH)_2$ seed precursor is prepared using a typical co-precipitation in a Continuous Stirred Tank Reactor (CSTR), having a specific residence time of 6 hours. The seed precursor composition can also be different as the seeds will only be a minor part of the final particle and as such do not impact its composition. At the start the reactor is filled with water and ammonia to get a 15 g/L of ammonia solution inside. The temperature in the reactor is 60° C. After the reactor is filled with the starting solution, the different reagents ($M'SO_4$ solution, NaOH solution, $NH_3$ solution) are pumped simultaneously in the reactor at different injection points, keeping the ammonia to metal ratio of 1:1 and keeping the pH around 11.7. There should be more than 2 $OH^-$ ions for each metal ion in the solution during the precipitation reaction. After 24 hours, the reactor is in steady state and the D50 is between 5 and 20 μm, and the slurry from the overflow is collected. The precipitated metal hydroxides are washed, filtered under a protective atmosphere to remove the dissolved salts and ammonia. 200 g of the wet cake is re-pulped in 1 L water and treated with a mechanical pulverization by ball mill. This treatment reduces the D50 size to less than 2 μm.

1-2) Precipitation of the MBP Particles:

MBP811 is prepared using a modified co-precipitation in a Continuous Stirred Tank Reactor (CSTR), having a specific or average residence time of 3 hours. $M'SO_4$ solution with Ni:Mn:Co molar ratio of 0.80:0.10:0.10 composition is used. At the start the reactor is filled with water and ammonia to get a 15 g/L of ammonia solution inside. The temperature in the reactor is 60° C. After the reactor is filled with the starting solution, different reagents ($M'SO_4$ solution, NaOH solution, $NH_3$ solution) are pumped simultaneously in the reactor at different injection points, keeping the ammonia to metal ratio of 1:1 and keeping the pH around 11.7 with the NaOH solution. There should be more than 2 $OH^-$ ions for each metal ion in the solution. After 6 hours, 100 g of seeds from S1 are added to the reactor. The particle size in the reactor immediately becomes large and the span becomes small. After at least 6 hours the span decreases steadily to a value below 0.9. At this point the particles have grown to around 6-11 μm. The slurry in the overflow is now collected in a beaker of 3 L and the particles are allowed to settle in the beaker. The beaker is decanted each 30 minutes, and the slurry is put back into the reactor. The dosing of the reagents is stopped when the particles reach a sufficient size (around 11 μm).

2) Preparation of positive electrode active materials

A polycrystalline positive electrode active material, P-NMC811, is obtained by blending MBP811 with a lithium source followed by sintering at high temperature. LiOH is selected as lithium source and the blending is designed to have a Li to metal mol ratio (Li/M') of 1.00. 30 g of this blend is sintered in a crucible at 780° C. The sintering at the target temperature is performed under an oxygen atmosphere for 12 hours. The sintered agglomerated compounds are crushed and sieved. P-NMC811 has a median particle size (D50) of 11 μm.

EX1 material is made by mixing P-NMC811 and LSPO according to a mixing ratio of 2:1 by weight, followed by a heat treatment at 700° C. for 3 hours in an oxygen atmosphere (i.e. like air).

In FIG. 1, XRD pattern of P-NMC811 in (a) is compared with the pattern of co-sintered P-NMC811 with LSPO (b) and pristine LSPO (c). The diffractogram in (b) shows similar peak position indicating crystal structure is maintained even after co-sintering in high temperature. The splitting of peak around 38° corresponds to (006)/(012) planes shows the typical R-3m layered structure. All the additional peaks in (b), for example in the range between 21 to 25°, are originated from LSPO phase as can be directly compared with graph (c). Table 2 and 3 showed the lattice parameter after Rietveld refinement of pristine NMC, co-sintered NMC+LSPO, and pristine LSPO. Relatively unchanged lattice parameter value obtained from before and after co-sintering indicating unchanging crystallite size and structure confirming the compatibility.

Example 2A

The lithium nickel cobalt manganese oxide having polycrystalline morphology with designed composition of NMC622 is the proprietary product of Umicore commercially available under Cellcore®HX12 grade. The product has a median particle size (D50) of 11.8 µm, BET=0.30 $m^2/g$, and Li:M'=1.03:1 and labelled P-NMC622.

EX2A-1 material is obtained through a similar manner as the preparation of EX1, except that P-NMC622 is used as the positive electrode active material.

EX2A-2 material is obtained through a similar manner as the preparation of EX1, except that P-NMC622 is used as the positive electrode active material and LSPGO is used as electrolyte.

Figure 2:
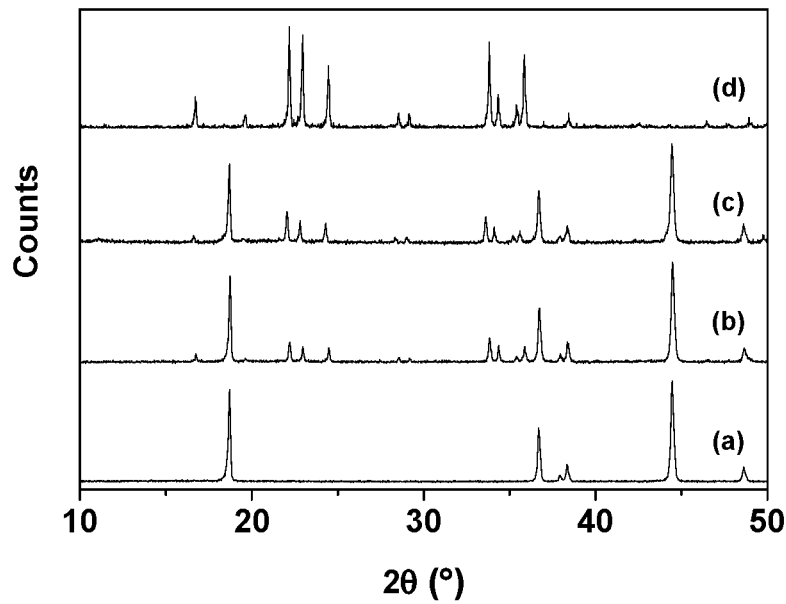
FIG. 2. Comparison of X-ray diffraction pattern of (a) polycrystalline NMC622 ($M'=Ni_{0.60}Mn_{0.20}Co_{0.20}$), (b) polycrystalline NMC622 after co-sintered with $Li_{3.5}Si_{0.5}P_{0.5}O_4$ electrolyte (EX2A-1), (c) polycrystalline NMC622 after co-sintered with $Li_{(3.5+x)}Si_{(0.5-x)}P_{(0.5-x)}Ge_{2x}O_{4+a}$ (x=0.1) electrolyte (EX2A-2), and (d) pristine $Li_{3.5}Si_{0.5}P_{0.5}O_4$.

FIG. 2 compares XRD pattern of pristine P-NMC622 (a) with the co-sintered patterns, each for mixture with LSPO (b) and LSPGO (c). The pristine LSPO diffraction pattern is displayed in (d) as the reference of additional peaks in NMC phase of (b) and (c).

Table 2 and 3 show the lattice parameter of NMC, LSPO, and LSPGO structure after co-sintering. The lattice parameter value remains constant indicating unchanging crystallite size and structure.

Example 2B

M-NMC622 compound having the target formula of $Li(Ni_{0.60}Mn_{0.20}Co_{0.20})O_2$ and monolithic morphology is obtained through a double sintering process and a wet milling process running as follows:

1) Co-precipitation: mixed transition metal hydroxides with D50 of around 4 µm are prepared by the process described in KR101547972B1 (from page 6 line 25 to page 7 line 32).

2) $1^{st}$ blending: to obtain a lithium deficient sintered precursor, $Li_2CO_3$ and the co-precipitation product are homogenously blended with a Li/M' ratio of 0.85 in a Henschel mixer for 30 minutes so as to obtain a $1^{st}$ blend.

3) $1^{st}$ sintering: the $1^{st}$ blend is sintered at 935° C. for 10 hours under an oxygen containing atmosphere. The product obtained from this step is a powderous lithium deficient sintered precursor with Li/M'=0.85.

4) Blending: the lithium deficient sintered precursor is blended with $LiOH \cdot H_2O$ to correct the Li stoichiometry to Li/M'=1.01. The blending is performed in a mixer for 30 minutes so as to obtain a $2^{nd}$ blend.

5) $2^{nd}$ sintering: the $2^{nd}$ blend is sintered at 890° C. for 10 hours in an oxygen containing atmosphere in a roller hearth kiln (RHK). The sintered blocks are crushed by a jaw crushing equipment.

6) Wet milling: To break the agglomerated intermediate particles into monolithic primary particles, a wet ball milling process is applied. 5 L bottle is filled with 1 L of deionized water, 5.4 kg $ZrO_2$ balls, and 1 kg of $2^{nd}$ sintering product from process number 5. The bottle is rotated on a commercial ball mill equipment.

7) Healing firing step ($3^{rd}$ sintering): The wet milled product is heated at 750° C. for 10 hours under oxygen containing atmosphere in a furnace. The sintered compound is sieved.

EX2B-1 material is obtained through a similar manner as the preparation of EX1, except that M-NMC622 is used as the positive electrode active material.

EX2B-2 material is obtained through a similar manner as the preparation of EX1, except that M-NMC622 is used as the positive electrode active material and LSPGO is used as electrolyte.

Figure 3:
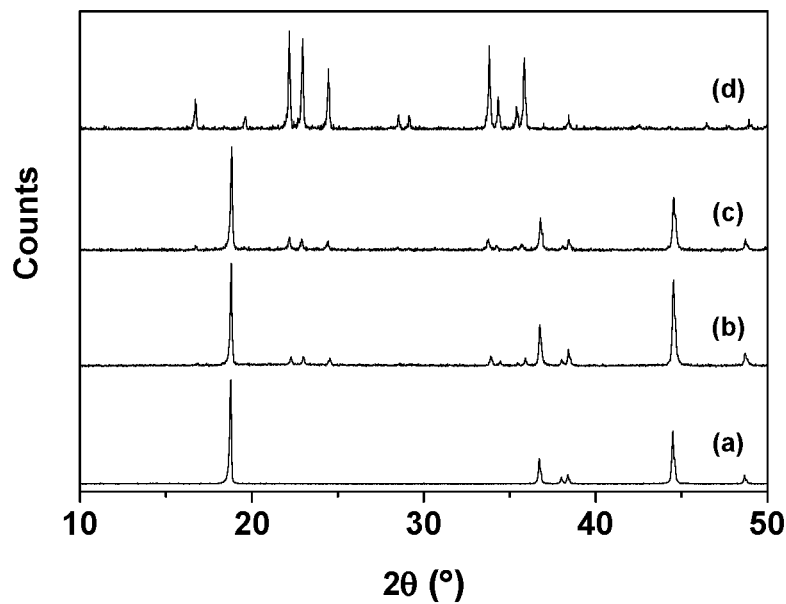
FIG. 3. Comparison of X-ray diffraction pattern of (a) monolithic NMC622 ($M'=Ni_{0.60}Mn_{0.20}Co_{0.20}$), (b) monolithic NMC622 after co-sintered with $Li_{3.5}Si_{0.5}P_{0.5}O_4$ electrolyte (EX2B-1), (c) monolithic NMC622 after co-sintered with $Li_{(3.5+x)}Si_{(0.5-x)}P_{(0.5-x)}Ge_{2x}O_{4+a}$ (x=0.2) electrolyte (EX2B-2), and (d) pristine $Li_{3.5}Si_{0.5}P_{0.5}O_4$.

FIG. 3 XRD pattern comparison shows similar tendency as FIG. 2 where the crystal structure remains constant after co-sintering. The result shows LSPO and LSPGO also compatible with M-NMC622 positive electrode active material.

Table 2 and 3 show the lattice parameter of NMC, LSPO, and LSPGO structure after co-sintering. The lattice parameter value remains constant indicating unchanging crystallite size and structure.

Example 3

The lithium nickel cobalt manganese oxide having polycrystalline morphology with designed composition of NMC111 $[Li_{1.13}Ni_{0.34}Mn_{0.33}Co_{0.33}O_{0.97}(OH)_{1.03}]$. The final product has a median particle size (D50) of 10.1 µm, BET=0.28 $m^2/g$, and Li:M'=1.095:1 and labelled P-NMC111.

Figure 4:
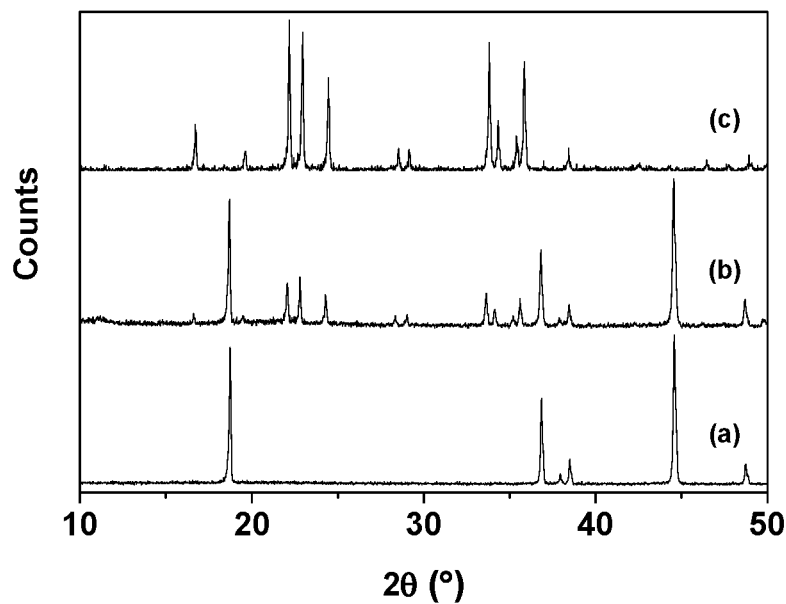
FIG. 4. Comparison of X-ray diffraction pattern of (a) polycrystalline NMC111 ($M'=Ni_{1/3}Mn_{1/3}Co_{1/3}$), (b) polycrystalline NMC111 after co-sintered with $Li_{3.5}Si_{0.5}P_{0.5}O_4$ electrolyte (EX3), and (c) pristine $Li_{3.5}Si_{0.5}P_{0.5}O_4$.

EX3 material is obtained through a similar manner as the preparation of EX1, except that P-NMC111 is used as the positive electrode active material. Structure compatibility between P-NMC111 and electrolytes examined through XRD is displayed in FIG. 4.

Table 2 and 3 show the lattice parameter of NMC, LSPO, and LSPGO structure after co-sintering. The lattice parameter value remains constant indicating unchanging crystallite size and structure.

Comparative Example 1

The spinel structured $LiNi_{0.5}Mn_{1.5}O_4$, S-LNMO, is prepared according to the following steps:

1) Blending: $Li_2CO_3$, NiO, and $Mn_2O_3$ with total weight of around 2.4 g according to the corresponding molar ratio were put on a 45 ml bottle with 30 ml of acetone and 3.4 g of Y doped $ZrO_2$ balls having a dimeter of 1 mm. The bottle was rotated in a conventional ball mill equipment with 500 RPM for 6 hours.

2) Drying: the blended powder is dried at 70° C. for 6 hours.

3) Sintering: the dried powder is heat treated at 900° C. for 24 hours.

CEX1 is prepared in a similar manner as the preparation of co-sintered samples in EX1, except that S-LNMO is used as the positive electrode active material.

Figure 5:
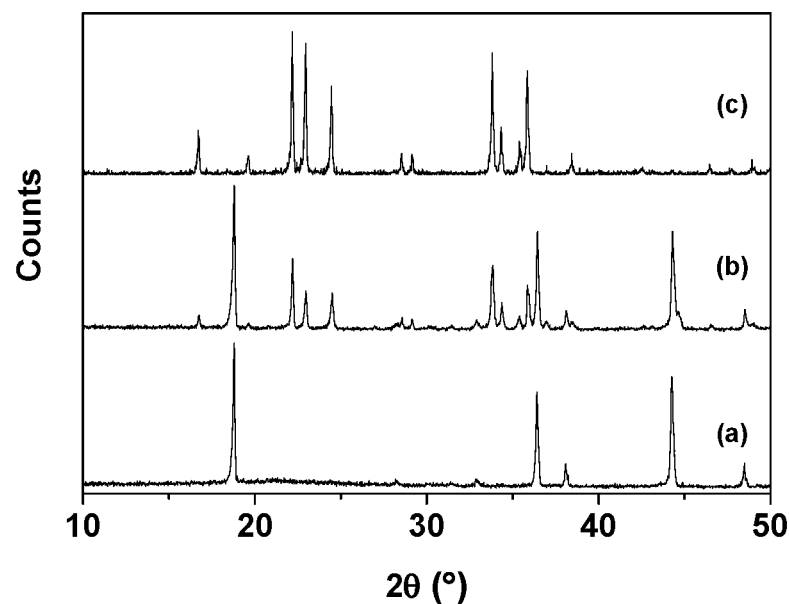
FIG. 5. Comparison of X-ray diffraction pattern of (a) cathode material $LiNi_{0.5}Mn_{1.5}O_4$, (b) cathode material $LiNi_{0.5}Mn_{1.5}O_4$ after co-sintered with $Li_{3.5}Si_{0.5}P_{0.5}O_4$ electrolyte (CEX1), and (c) pristine $Li_{3.5}Si_{0.5}P_{0.5}O_4$.

X-Ray diffraction pattern in FIG. 5 shows compatibility examination for the spinel structured positive electrode active material with SE in the invention. The diffractogram of CEX1 still shows peaks contribution from both components. However, the lattice parameter a as displayed in Table 2 shows large change from 8.179 Å in LNMO to 8.167 Å after mixed with LSPO indicating the incompatibility of the two materials.

Explanatory Example 1

To examine the stability of electrolyte with Li metal, LSPGO is directly contacted with molten Li metal. LSPGO pellet is made by pressing 0.175 g of powder under 2349.7 kgf/cm$^2$ pressure followed by sintering at 700° C. for 3 h under 02 atmosphere. A stripe of Li foil is placed on the stainless-steel plate heated on 250° C. hot plate. The molten Li is directly poured on the prepared LSPGO pellet and the pellet is observed for 15 minutes. All experiment is done in a glove box with Ar atmosphere. The pellet is visually observed of thermal runaway and the structure is examined using X-Ray diffraction.

Example 4

EX4-1 is obtained through a similar manner as the preparation of EX2B-1 except that the mixing ratio between M-NMC622 and LSGPO is 1:1 by weight.

EX4-2 is obtained through a similar manner as the preparation of EX4-1 except that the mixture is sintered at 600° C.

Comparative Example 2

CEX2-1, CEX2-2, and CEX2-3 are obtained through a similar manner as the preparation of EX4-2 except that the mixture is sintered at 500° C., 900° C., and not sintered, respectively, as displayed in Table 1.

Electrochemical Stability of LSPO and LSPGO with NMC

TABLE 1

List of Examples and Comparative Examples

| Sample ID | Positive Electrode Material (PEM) | D50 PEM (μm) | Solid electrolyte (SE) | D50 SE (μm) | Positive electrode material: solid electrode (weight) | Co-sintering temperature (° C.) |
|---|---|---|---|---|---|---|
| EX1 | P-NMC811 | 11.0 | LSPO | 2.0 | 2:1 | 700 |
| EX2A-1 | P-NMC622 | 11.8 | LSPO | 2.0 | 2:1 | 700 |
| EX2A-2 | | | LSPGO | 2.0 | 2:1 | 700 |
| EX2B-1 | M-NMC622 | 4.0 | LSPO | 2.0 | 2:1 | 700 |
| EX2B-2 | | | LSPGO | 2.0 | 2:1 | 700 |
| EX3 | P-NMC111 | 10.1 | LSPO | 2.0 | 2:1 | 700 |
| CEX1 | S-LNMO | — | LSPO | 2.0 | 2:1 | 700 |
| EX4-1 | M-NMC622 | 4.0 | LSPO | 2.0 | 1:1 | 700 |
| EX4-2 | | | | | 1:1 | 600 |
| CEX2-1 | | | | | 1:1 | 500 |
| CEX2-2 | | | | | 1:1 | 900 |
| CEX2-3 | | | | | 1:1 | —** |

* P-, M-, and S- stand for polycrystalline, monolithic, and spinel, respectively.
**not sintered.

TABLE 2

Lattice Parameter of positive electrode material before and after co-sintering with solid electrolytes obtained from Rietveld refinement of the X-ray Diffractograms

| | Lattice parameter of NMC (Å) | | |
|---|---|---|---|
| Sample ID | A | C | c/a |
| P-NMC811 | 2.874 | 14.209 | 4.994 |
| EX1 | 2.881 | 14.226 | 4.938 |
| P-NMC622 | 2.868 | 14.226 | 4.959 |
| EX2A-1 | 2.869 | 14.231 | 4.960 |
| EX2A-2 | 2.868 | 14.234 | 4.962 |
| M-NMC622 | 2.869 | 14.211 | 4.953 |
| EX2B-1 | 2.869 | 14.213 | 4.953 |
| EX2B-2 | 2.869 | 14.220 | 4.995 |
| P-NMC111 | 2.860 | 14.234 | 4.977 |
| EX3 | 2.859 | 14.235 | 4.978 |
| S-LNMO | 8.179 | —** | —** |
| CEX1 | 8.167 | —** | —** |

**not measured.

TABLE 3

Lattice Parameter of solid electrode material before and after co-sintering with Positive electrode material obtained from Rietveld refinement of the X-ray Diffractograms

| Sample ID | Lattice parameter of LS(G)PO (Å) | | |
|---|---|---|---|
| | A | B | C |
| LSPO | 10.605 | 6.123 | 5.011 |
| EX1 | 10.591 | 6.119 | 5.006 |
| EX2A-1 | 10.597 | 6.121 | 5.005 |
| EX2B-1 | 10.586 | 6.120 | 5.006 |
| EX3 | 10.595 | 6.122 | 5.004 |
| CEX1 | 10.578 | 6.120 | 4.995 |
| LSPGO | 10.656 | 6.145 | 5.041 |
| EX2A-2 | 10.661 | 6.149 | 5.041 |
| EX2B-2 | 10.652 | 6.145 | 5.041 |

Figure 6:
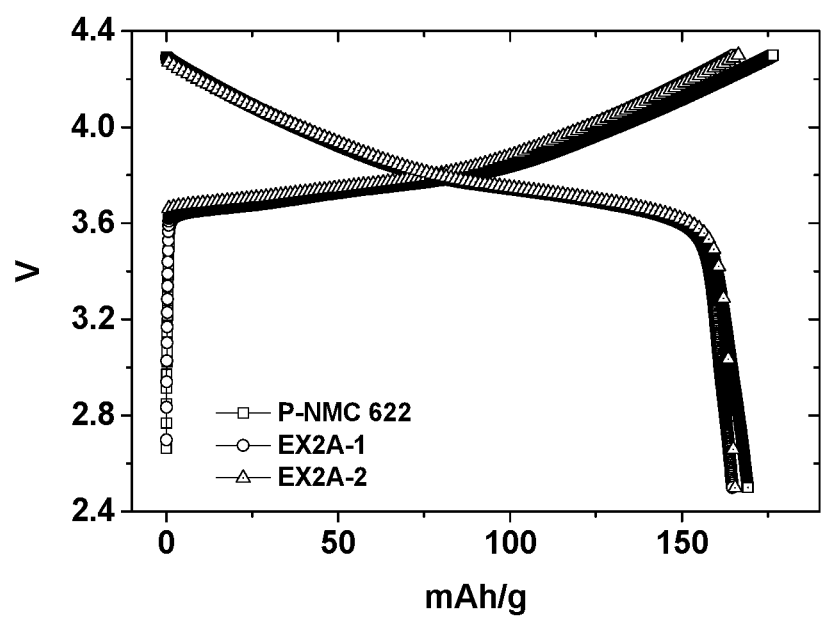
FIG. 6. Comparison of voltage VS capacity graph using polycrystalline NMC622 ($M'=Ni_{0.60}Mn_{0.20}Co_{0.20}$), polycrystalline NMC622 after co-sintering with $Li_{3.5}Si_{0.5}P_{0.5}O_4$ electrolyte (EX2A-1), and polycrystalline NMC622 after co-sintering with $Li_{(3.5+x)}Si_{(0.5-x)}P_{(0.5-x)}Ge_{2x}O_{4+a}$ (x=0.1) electrolyte (EX2A-2)
Figure 7:
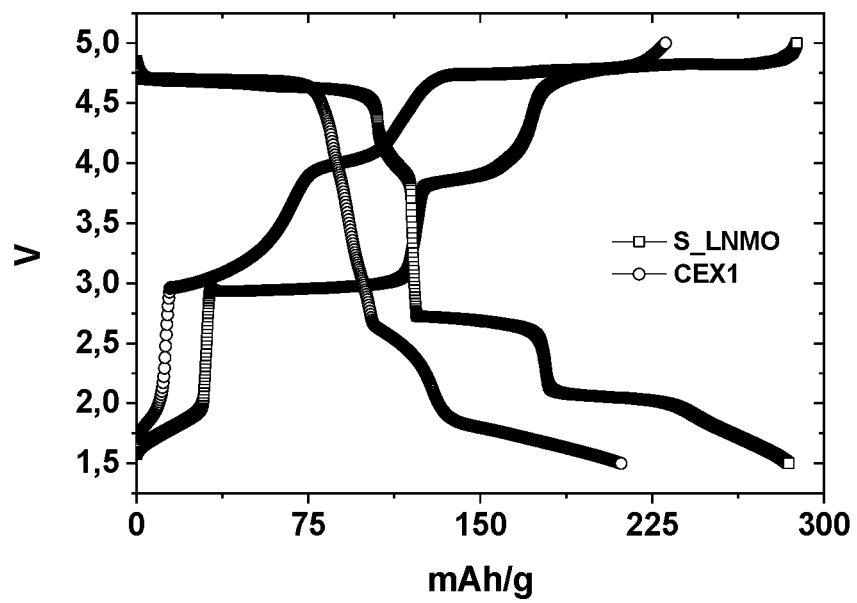
FIG. 7. Comparison of voltage VS capacity graph using spinel $LiNi_{0.5}Mn_{1.5}O_4$ and spinel $LiNi_{0.5}Mn_{1.5}O_4$ after co-sintered with $Li_{3.5}Si_{0.5}P_{0.5}O_4$ electrolyte (CEX1)

Electrochemical stability of LSPO and LSPGO with P-NMC622 in EX2 are compared through the charge-discharge measurement. The capacity is normalized with the amount of positive electrode active material. As shown in FIG. 6, evaluation is done in 4.3~2.5V window range. First charge and discharge values for P-NMC622 are 176.52 and 169.16 mAh/g, respectively. Small change of capacity is observed in the combination with LSPO electrolyte where the value is 164.97 mAh/g and 164.68 mAh/g for first charge and discharge capacity value, respectively. Combination of P-NMC622 with LSPGO gives a little higher capacity value comparing to the mixture with LSPO. They are 166.44 mAh/g each for first charge and 165.48 mAh/g for discharge capacity. The slightly higher value mainly related with the more conductive LSPO after doping with Ge. The curve shape for all specimen are similar indicating NMC622 and SE electrochemical stability. On the contrary, coin cell evaluation shows that the charge and discharge capacity value for CEX1 have a significant difference with that of pristine S-LNMO. As shown in FIG. 7, evaluation is done in 1.5~5.0V window range. First charge and discharge values for S-LNMO are 288.14 mAh/g and 284.66 mAh/g, respectively. Large difference of capacity is observed in the combination with LSPO electrolyte where the value is 230.89 mAh/g and 211.52 mAh/g for first charge and discharge capacity value, respectively. This indicating the stability of P-NMC622 mixture with LSP(G)O but not for mixture of S-LNMO with LSPO.

TABLE 4

Particle size distribution and ionic conductivity of EX4 and CEX2 material

| Sample ID | Co-sintering temperature (°C.) | D50 (μm) | D99 (μm) | Ionic conductivity (S/cm) | First discharge capacity (mAh/g) |
|---|---|---|---|---|---|
| EX4-1 | 700 | 10.2 | 34.7 | $1 \times 10^{-5}$ | 176.4 |
| EX4-2 | 600 | 10.3 | 31.0 | $2 \times 10^{-6}$ | — |
| CEX2-2 | 900 | 10.5 | 143.0 | $9 \times 10^{-4}$ | 133.8 |

Figure 9:
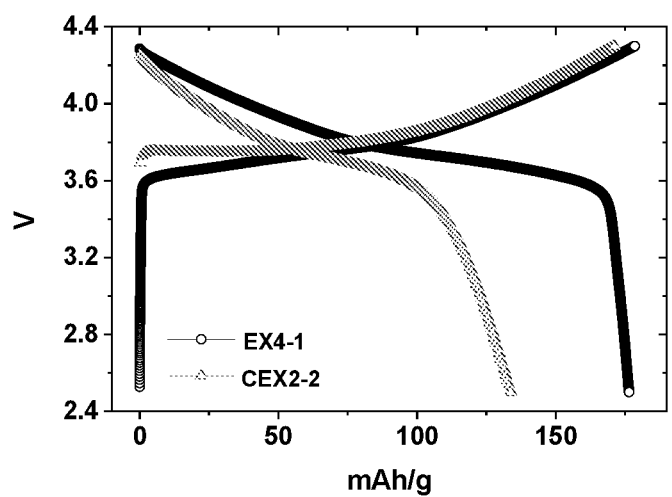

The results of the size distribution measurement as displayed in the Table 4 show that EX4-1, EX4-2, and CEX2-2 have a similar D50 at around 10.2-10.5 μm. However, the D99 values are larger at the higher co-sintering temperature. For instance, the D99 of EX4-1 (resulting from a sintering at 700° C.) is 34.7 μm while the D99 of CEX2-2 (resulting from a co-sintering at 900° C.) is 143.0 μm. The coin cell characterization of EX4-1 and CEX2-2 as displayed in FIG. 9 shows the effect of the co-sintering temperature to the electrochemical performance. Here, CEX2-2 sintered at 900° C. clearly shows a lower discharge capacity comparing to EX4-1 sintered at 700° C.

On the other hand, co-sintering temperature lower than 600° C. is also unpreferable. The ionic conductivity data provided in Table 4 also demonstrate that the ionic conductivity of the catholyte depends upon the co-sintering temperature, wherein the catholyte is more conductive at a higher co-sintering temperature. EX4-1 which results from a co-sintering prepared at 700° C. has an ionic conductivity of $10^{-5}$ S/cm while CEX2-1 (resulting from a co-sintering at 500° C.) has an ionic conductivity of $10^{-7}$ S/cm, i.e. a decrease of ×100 is observed for this sample with respect to EX4-1's ionic conductivity.

Chemical Stability of the Electrolyte with a Li Metal Foil

Figure 8:
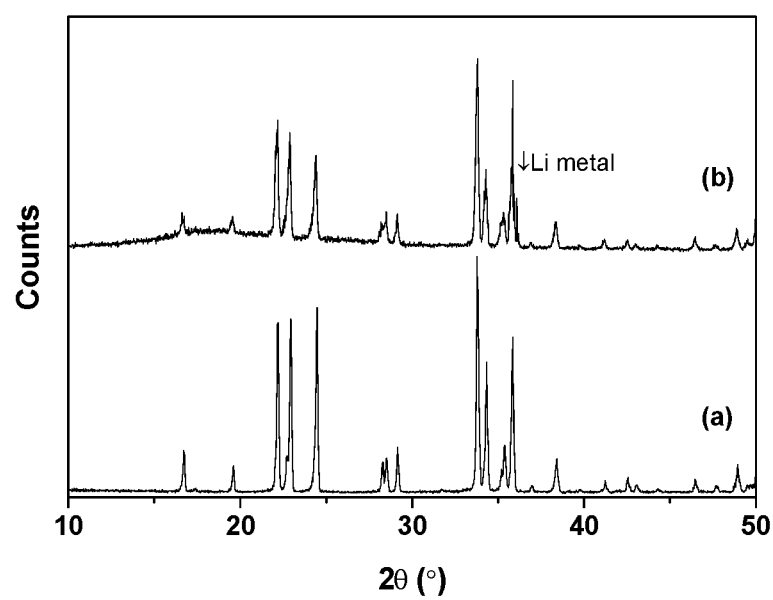
FIG. 8. Comparison of X-ray diffraction pattern of LSPO (a) before exposure to molten Li metal at 250° C. and (b) after 15 minutes exposure FIG. 9. Comparison of voltage VS capacity graph using monolithic NMC622 ($M'=Ni_{0.60}Mn_{0.20}Co_{0.20}$) after co-sintering with $Li_{3.5}Si_{0.5}P_{0.5}O_4$ electrolyte at 700° C. (EX4-1) and monolithic NMC622 after co-sintering with $Li_{3.5}Si_{0.5}P_{0.5}O_4$ electrolyte at 900° C. (CEX2-2)

The chemical stability of LSPGO with Li metal was examined through a direct contact with the molten Li metal. LSPGO pellet XRD diffraction pattern after exposure with molten Li metal is compared with the original pattern before exposure as displayed in FIG. 8. Both measurements produced diffractogram with the same peak location indicating the structure remain the same (there is no structural change as the result of reaction with Li metal). The pellet is also observed to be very stable upon contact without thermal runaway or any exothermic reaction.

The invention claimed is:

1. A catholyte configured for use in a lithium ion solid-state battery, said catholyte comprising:
  i. a solid electrolyte powder, wherein a formula for the solid electrolyte powder consists of $Li_{(3.5+L+x)}Si_{(0.5+s-x)}P_{(0.5+p-x)}Ge_{2x}O_{4+a}$, wherein $-0.10 \leq L \leq 0.10$, $-0.10 \leq s \leq 0.10$, $-0.10 \leq p \leq 0.10$, $-0.40 \leq a \leq 0.40$, and $0.00 \leq x \leq 0.30$, and
  ii. a positive electrode active material powder, wherein a formula for the positive electrode active material powder is $Li_{1+k}M'_{1-k}O_2$ where $M'=Ni_{1-x'-y'-z'}Mn_{x'}Co_{y'}A_{z'}$ with $-0.05 \leq k \leq 0.05$, $0 \leq x' \leq 0.40$, $0.05 \leq y' \leq 0.40$, and $0 \leq z' \leq 0.05$, wherein A is a doping element which is different to Li, M' and O, said positive active material powder comprising particles having a layered R-3m crystal structure,
  wherein said catholyte has a D99, wherein 30 μm ≤ D99 ≤ 50 μm and an ionic conductivity of at least $1.0 \times 10^{-6}$ S/m.

2. The catholyte according to claim 1, wherein A comprises one or more of Al, Ca, W, B, Si, Ti, Mg or Zr.

3. The catholyte according to claim 1, wherein the catholyte has a solid electrolyte:positive electrode active material weight ratio greater than or equal to 10:90 and less than or equal to 50:50.

4. The catholyte according to claim 1, wherein the positive electrode active material powder comprises particles having a monolithic or polycrystalline morphology.

5. The catholyte according to claim 1 having an ionic conductivity of at least $1.0 \times 10^{-5}$ S/m.

6. A solid state battery comprising the catholyte according to claim 1, a solid-state electrolyte, and a Li metal anode.

7. A process for making the catholyte according to claim 1, comprising the steps of:
  mixing the solid electrolyte powder having the formula: $Li_{(3.5+L+x)}Si_{(0.5+s-x)}P_{(0.5+p-x)}Ge_{2x}O_{4+a}$, with the positive electrode active material powder having the formula: $Li_{1+k}M'_{1-k}O_2$ where $M'=Ni_{1-x'-y'-z'}Mn_{x'}Co_{y'}A_{z'}$ with $-0.05 \leq k \leq 0.05$, $0 \leq x' \leq 0.40$, $0.05 \leq y' \leq 0.40$, and $0 \leq z' \leq 0.05$, so as to obtain a mixture,
  heating the mixture in an oxidizing atmosphere at a temperature of at least 600° C. and at most 800° C., thereby obtaining the catholyte according to claim 1.

8. The process according to claim 7, wherein the solid electrolyte powder and the positive electrode active material powder are mixed together in a solid electrolyte:positive electrode active material weight ratio superior or equal to 10:90 and inferior or equal to 50:50.

9. The process according to claim 7, wherein the step of heating the mixture is performed during at least 1 hour and at most 20 hours.

10. The process according to claim 7, wherein the step of heating the mixture is performed in an atmosphere comprising at least 15 vol % of oxygen.

* * * * *